(12) United States Patent
Hashimoto (10) Patent No.: US 7,720,865 B2
(45) Date of Patent: May 18, 2010

(54) DOCUMENT MANAGEMENT APPARATUS, DOCUMENT MANAGEMENT METHOD, AND STORAGE MEDIUM STORING PROGRAM

(75) Inventor: Sunao Hashimoto, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 419 days.

(21) Appl. No.: 11/077,083

(22) Filed: Mar. 11, 2005

(65) Prior Publication Data

US 2006/0010097 A1   Jan. 12, 2006

(30) Foreign Application Priority Data

Jul. 9, 2004   (JP)   ............................. 2004-202624

(51) Int. Cl.
*G06F 17/30* (2006.01)
(52) U.S. Cl. ...................... 707/785; 709/206
(58) Field of Classification Search ................ None
See application file for complete search history.

(56) References Cited

U.S. PATENT DOCUMENTS

| | | | | |
|---|---|---|---|---|
| 5,887,171 A * | 3/1999 | Tada et al. | .................. | 719/317 |
| 6,192,396 B1 * | 2/2001 | Kohler | ........................ | 709/206 |
| 6,360,252 B1 * | 3/2002 | Rudy et al. | ................. | 709/206 |
| 6,446,093 B2 * | 9/2002 | Tabuchi | ....................... | 707/205 |
| 6,553,107 B2 * | 4/2003 | Jarvi et al. | ............. | 379/114.03 |
| 6,671,718 B1 * | 12/2003 | Meister et al. | ............... | 709/206 |
| 6,823,368 B1 * | 11/2004 | Ullmann et al. | ............. | 709/206 |
| 6,980,993 B2 * | 12/2005 | Horvitz et al. | ............... | 707/102 |
| 7,092,994 B2 * | 8/2006 | Nishio et al. | ................. | 709/206 |
| 7,117,210 B2 * | 10/2006 | DeSalvo | ....................... | 707/10 |
| 7,367,048 B2 * | 4/2008 | Kelley et al. | .................... | 726/2 |
| 2002/0007309 A1 * | 1/2002 | Reynar | ......................... | 705/14 |
| 2003/0028600 A1 * | 2/2003 | Parker | ......................... | 709/206 |
| 2003/0041112 A1 * | 2/2003 | Tada et al. | ................... | 709/206 |
| 2003/0135565 A1 * | 7/2003 | Estrada | ....................... | 709/206 |
| 2003/0163531 A1 * | 8/2003 | Nakajima | .................... | 709/206 |
| 2003/0233419 A1 * | 12/2003 | Beringer | ..................... | 709/206 |
| 2004/0107197 A1 * | 6/2004 | Shen et al. | ..................... | 707/9 |
| 2004/0158612 A1 * | 8/2004 | Concannon | .................. | 709/206 |
| 2005/0033811 A1 * | 2/2005 | Bhogal et al. | ............... | 709/206 |

FOREIGN PATENT DOCUMENTS

JP      A 2003-281332      10/2003

* cited by examiner

*Primary Examiner*—Kuen S Lu
*Assistant Examiner*—Michelle Owyang
(74) *Attorney, Agent, or Firm*—Oliff & Berridge, PLC

(57) ABSTRACT

A document management apparatus for managing an object includes an input unit that inputs setting of an operation related to an object, an execution unit that executes a predetermined operation related to the object, based on the setting, a setting selection unit that selects setting of an operation related to a past-executed object, and an object selection unit that designates an object to which the setting selected by the setting selection unit is applied, wherein the setting of the operation related to the object is performed by utilizing the content of past setting of an operation related to another object of the same or a different type.

18 Claims, 7 Drawing Sheets

DOCUMENT MANAGEMENT APPARATUS, DOCUMENT MANAGEMENT METHOD, AND STORAGE MEDIUM STORING PROGRAM

BACKGROUND OF THE INVENTION

1. Field of the Invention

The present invention relates to a document management technique for circulating a document managed by a document management apparatus among users or notifying change of document by e-mail, and more particularly for facilitation of setting of operations including circulation and e-mail notification.

2. Description of the Related Art

As a system for circulating an electronic document managed by a document management apparatus, it is known to provide a system for recirculating a once-circulated electronic document. According to this system, when a once-circulated electronic document where an electronic seal is affixed is recirculated, a work flow system recirculates the electronic document to a sealer of the electronic seal.

However, in the system, since only the sealer of the electronic seal on the electronic document can be designated as a destination of recirculation, the once-circulated document is merely circulated to the same destination.

SUMMARY OF THE INVENTION

The present invention has been made in view of the above situation, and provides a document management technique for easily setting a circulation destination.

According to one aspect of the present invention, a document management apparatus for managing an object includes an input unit that inputs setting of an operation related to an object, an execution unit that executes a predetermined operation related to the object, based on the setting, a setting selection unit that selects setting of an operation related to a past-executed object, and an object selection unit that designates an object to which the setting selected by the setting selection unit is applied, wherein the setting of the operation related to the object is performed by utilizing the content of past setting of an operation related to another object of the same or a different type.

BRIEF DESCRIPTION OF THE DRAWINGS

Embodiments of the present invention will be described in detail based on the following figures, wherein.

DETAILED DESCRIPTION OF THE INVENTION

Hereinbelow, embodiments of the present invention will now be described.

Figure 1:
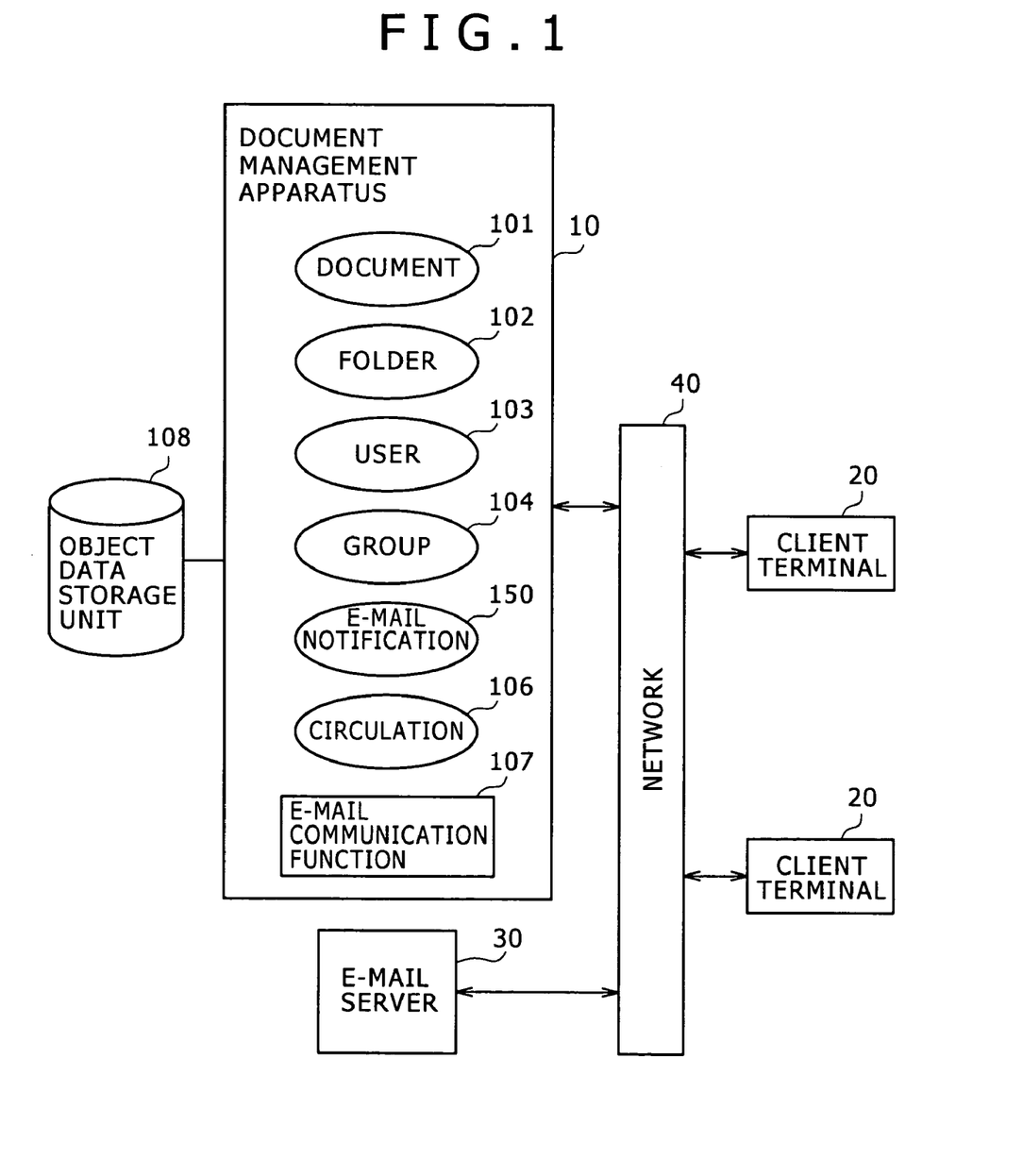
FIG. 1 is a block diagram showing the entire construction of a document management apparatus according to an embodiment of the present invention.

FIG. 1 shows a document management apparatus and its use environment. In FIG. 1, a document management apparatus 10, client terminals 20, an e-mail server 30 and the like are connected to a network 40. The network 40 is typically a local communication network (LAN), however, the network 40 is not limited to a LAN but may be an arbitrary communication network corresponding to service purpose such as the Internet or a wide area private network. The two client terminals 20 are shown here, but the number of the client terminals is arbitrary. Further, the construction of the client terminal 20 is arbitrary. The client terminal 20 may be a personal computer, home electrical equipment having an information processing function, a mobile phone, a fixed telephone and the like.

The document management apparatus 10 is, e.g., a server computer. The document management apparatus 10 has various hardware resources including a CPU, a main memory, an external storage device and the like and software resources. The document management apparatus 10 is implemented by installing one or plural predetermined computer programs via a storage medium or downloading to, e.g., a server computer. The document management apparatus 10 manages various objects including a document object 101, a folder (directory) object 102, a user object 103, a group (user group) object 104, an e-mail notification object 105, a circulation object 106 and the like. The object is formed with data and method in principle, however, the object may be implemented in any way. These data pieces on objects are stored as a database or directory service data, in an object data storage unit 108 such as an external storage device.

The document management apparatus 10, having an e-mail communication function 107, generates an e-mail, and transmits the e-mail to a predetermined mail account.

The e-mail server 30 provides, e.g., the POP service and SMTP service. Although FIG. 1 shows only one e-mail server 30, however, plural e-mail servers 30 may be used.

Figure 2:
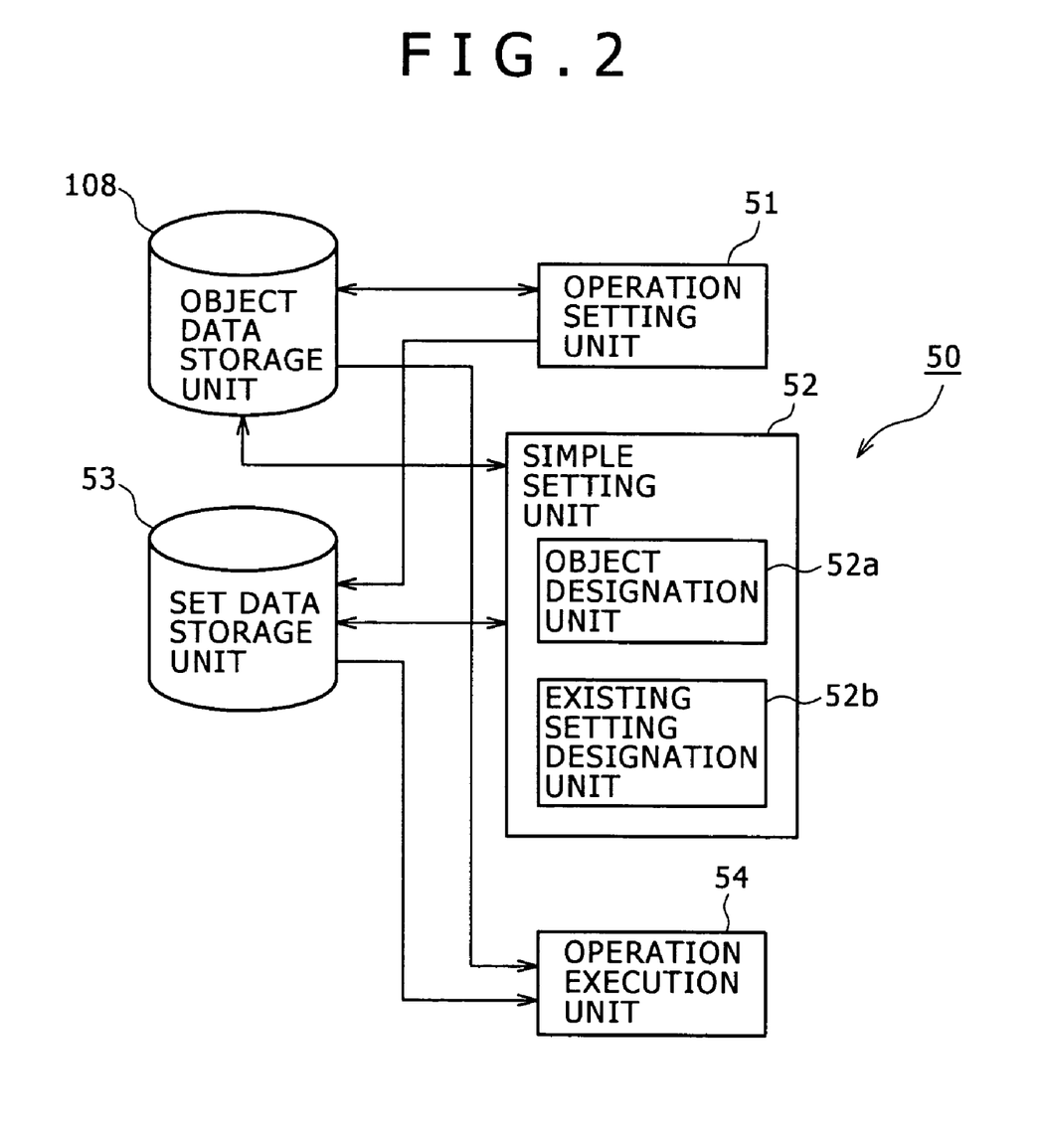
FIG. 2 is a block diagram schematically showing an operation setting unit of the document management apparatus according to the embodiment.

FIG. 2 schematically shows setting of an operation related to an object in the document management apparatus 10 of the embodiment. In the present embodiment, a particular example of setting of an operation related to an object in the document management apparatus 10 will be described. Note that the setting of the operation is not limited to the example.

Figure 3:
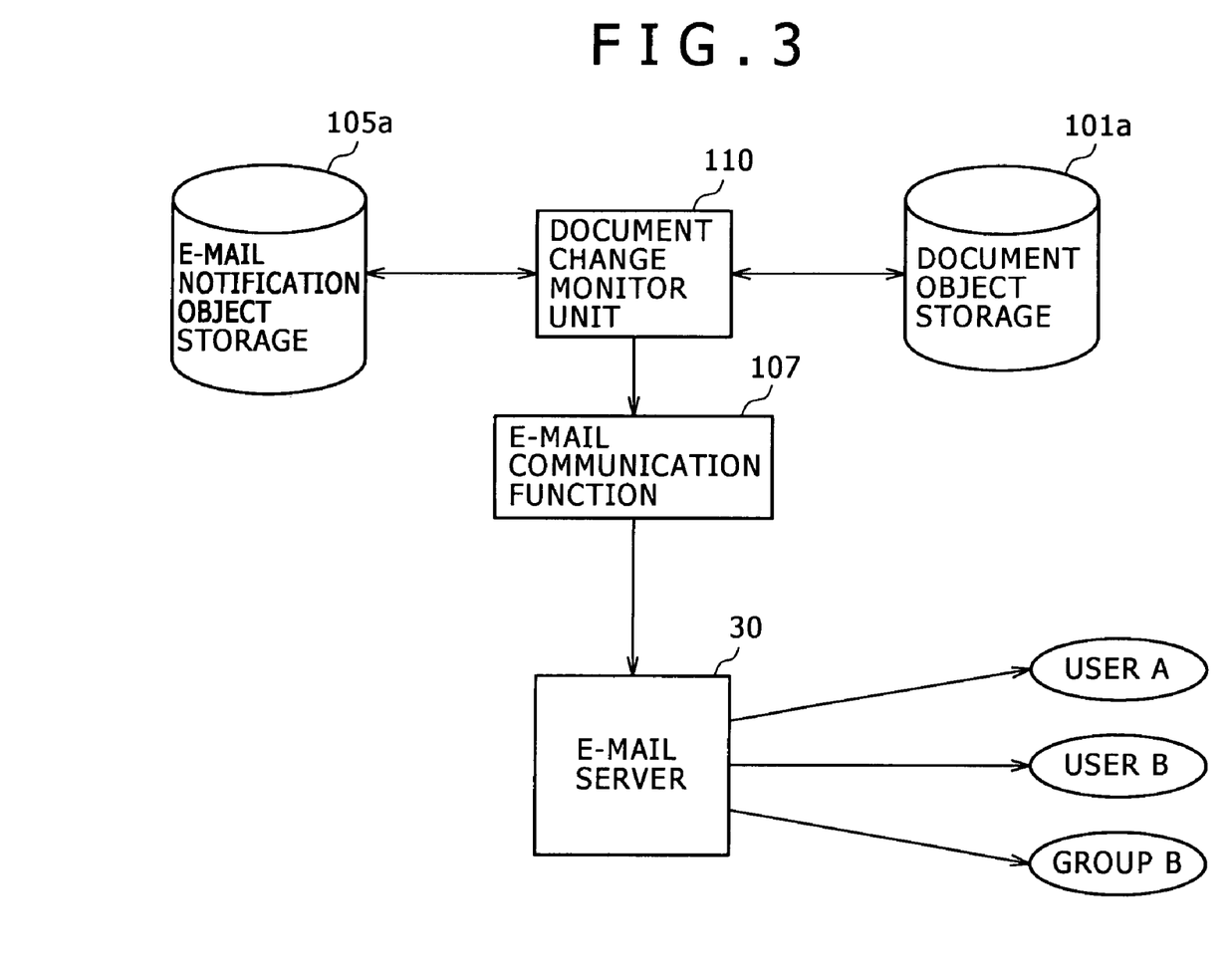
FIG. 3 is a block diagram showing setting of an e-mail communication object according to the embodiment.

FIG. 3 illustrates an example of setting of an operation related to an e-mail notification object. The e-mail notification object is used when a predetermined event has occurred in a predetermined object for transmitting e-mail notifying of the occurrence of the event to destinations described in a list. In this example, the object is a document object. As shown in FIG. 3, the document object 101 is stored in a document object storage 101a, and the e-mail notification object 105 is stored in an e-mail notification object storage 105a. The e-mail notification object 105 includes a document object ID, a notification destination e-mail account list, an occurred event and the like. Normally, a user inputs these document object ID, notification destination e-mail account list, an occurred event and the like using a predetermined user interface, thereby defines the e-mail notification object. In this example, the event is document update. A document change monitor unit 110 monitors the occurrence of a document update, and when the corresponding document update has occurred, generates e-mail to e-mail accounts (e.g., a user A, a user B and a group C) included in the notification destination e-mail account list and transfers the e-mail to the e-mail server 30 utilizing the e-mail communication function 107. The users A and B and the group C users obtain the e-mail from the e-mail server 30.

Figure 4:
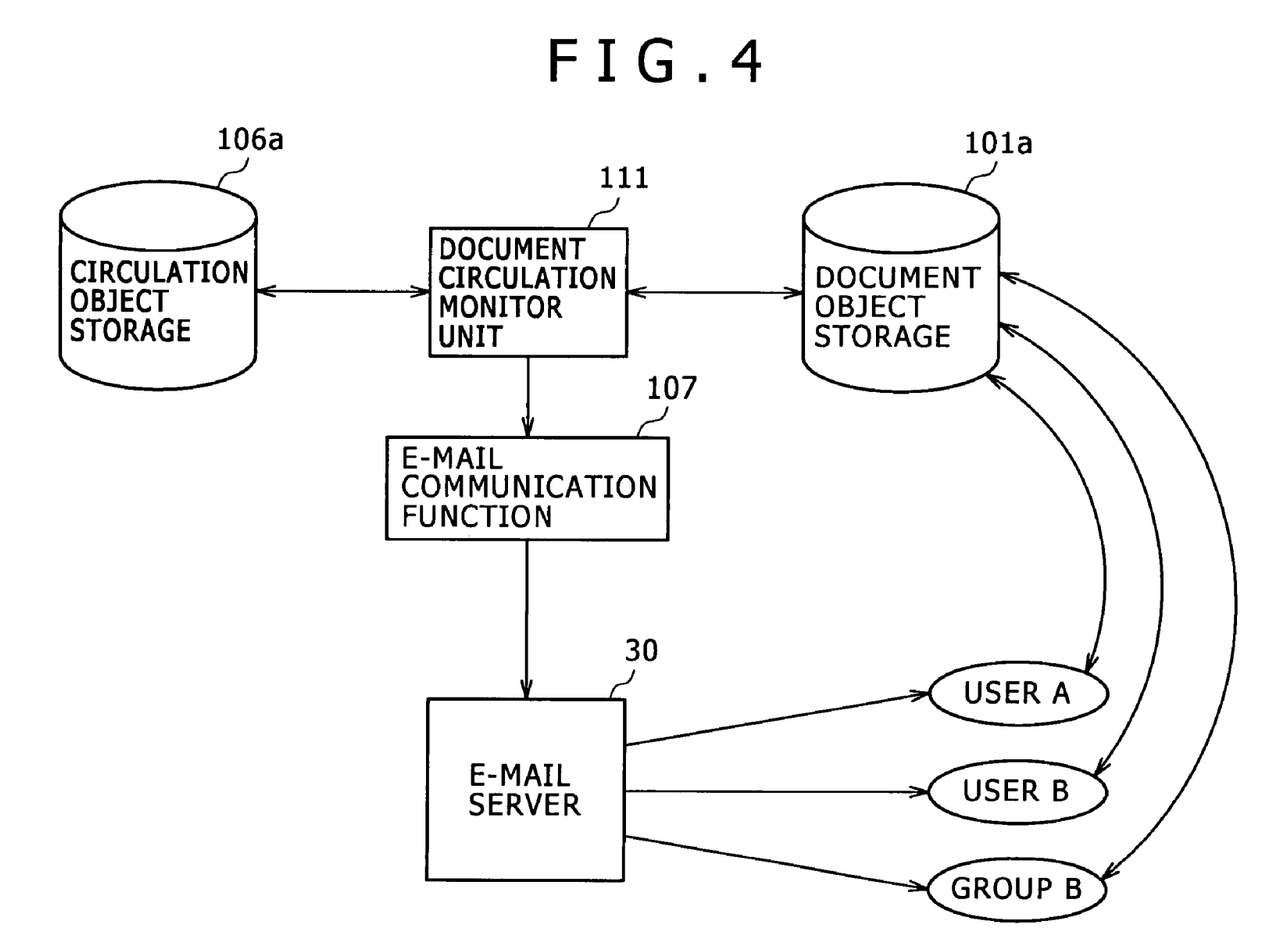
FIG. 4 is a block diagram showing setting of a circulation object according to the embodiment.

FIG. 4 shows an example of setting of an operation related to a circulation object. The circulation object is used for circulating a predetermined document. The circulation may be sequentially performed, or may be performed in parallel. As shown in FIG. 4, the document object 101 is stored in the document object storage 101a, and the circulation object 106 is stored in a circulation object storage 106a. The circulation object 106 includes a document object ID, a circulation destination e-mail account list, a termination condition, an action upon termination, and the like. Normally, the user inputs these document object ID, circulation destination e-mail account list, termination condition, action upon termination and the like using a predetermined user interface, thereby defines the circulation object. A document circulation monitor unit 111 performs notification to document circulation destinations by e-mail, and monitors a circulation status based on access to the document from the circulation destinations or the like. When the termination condition of the circulation has been satisfied, the document circulation monitor unit 111 gives notification to a user who set the circulation object, and the like, by e-mail. In this example, the document circulation monitor unit 111 performs circulation notification to the user A, the user B and the group C users, and remind them of document authentication operation.

Figure 5:
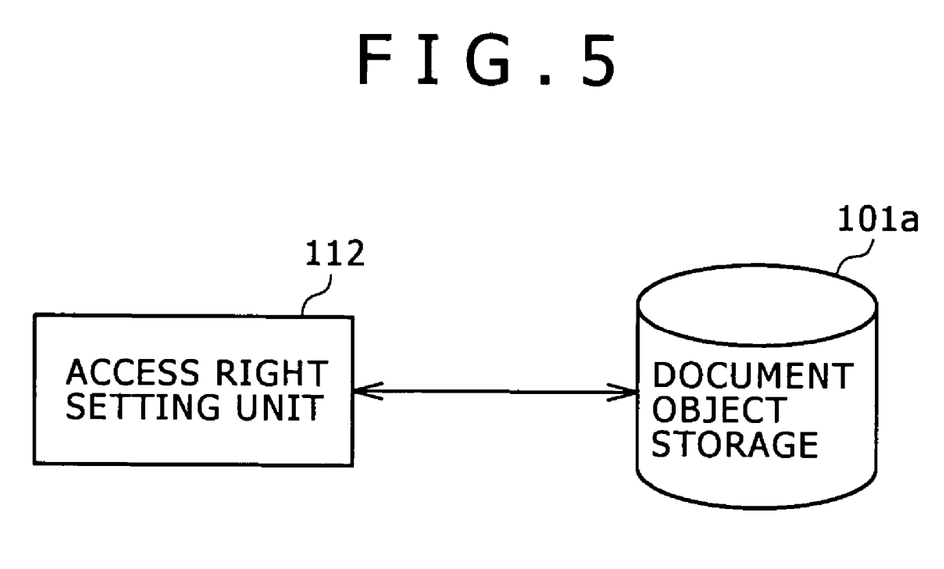
FIG. 5 is a block diagram showing setting of an access right of a document object according to the embodiment.

FIG. 5 illustrates an example of an operation to set a document access right. The access right is used for, e.g., search result display, reading, writing, and all change, however, not limited to these operations. As shown in FIG. 5, the document access right is set by using an access right setting unit 112 via a predetermined user interface.

Returning to FIG. 2, the figure schematically shows a part for setting of an operation related to an object in the document management apparatus 10, in this example, referred to as an operation setting portion 50. In FIG. 2, the operation setting portion 50 includes an operation setting unit 51 and a simple setting unit 52. The simple setting unit 52 includes an object designation unit 52a and an existing setting designation unit 52b. A set data storage unit 53 holds set data. Basically, the set data storage unit 53 is a part of the object data storage unit 108. For example, when an e-mail notification object is set regarding a document object and an e-mail notification operation is set, the e-mail notification object is newly added as set data in the object data storage unit 108. Further, when an access right of a document object is set, access right attributes of the document object 101 are updated with default values or existing set values. In this case, data as the subject of setting is the attribute of the document object. Note that in FIG. 2, object data (object data storage unit 108) and set data (set data storage unit 53) are individually shown for the sake of convenience.

The operation setting unit 51 inputs respective setting values using a predetermined user interface as described above with reference to FIGS. 3 to 5. The data set by the operation setting unit 51 is stored in the set data storage unit 53. The object designation unit 52a of the simple setting unit 52 designates an object, such as a second document, as the subject of setting. The designation is made by using a predetermined user interface. The existing setting designation unit 52b refers to the set data storage unit 53 to designate an object, such as a first document, from which existing setting is utilized. The type of object may be different from that of the object as the subject of setting. The object from which the existing setting is utilized may be limited within a predetermined range. For example, the object for reutilization may be selected from objects having recent setting time, objects set by the user himself/herself, or objects set by users in the same group, or limited type of objects. In this manner, the contents of existing setting of operation related to an object, in accordance with a first predetermined operation, are copied as the contents of setting of a second predetermined operation related to the object as the subject of setting. The set data inputted by the simple setting unit 52 is also stored in the set data storage unit 53. The set data inputted by the simple setting unit 52 may be reutilized by the simple setting unit 52. An operation execution unit 54 executes the operation, e.g., transmission of notification e-mail, notification of circulation, access control and the like, based on the set data.

Next, examples of simple setting will be described.

Figure 6:
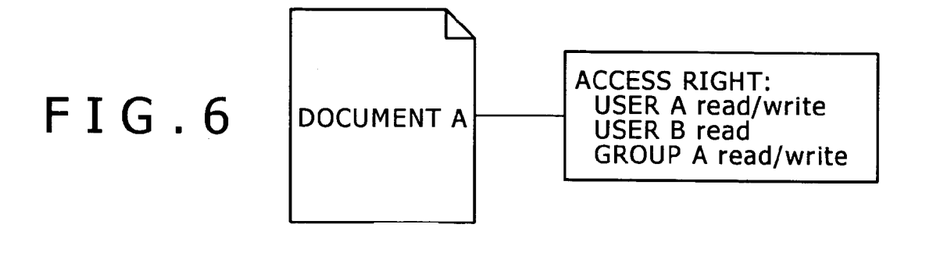
FIG. 6 is an explanatory diagram showing an operation for setting a circulation object utilizing an access right list.
Figure 7:
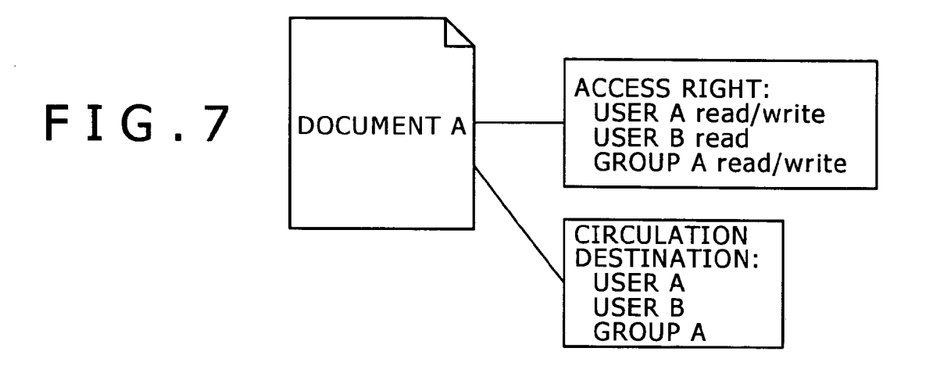
FIG. 7 is an explanatory diagram showing an operation for setting a circulation object utilizing an access right list.

FIG. 6 shows a method of reutilizing users or a group described in an access right list, held in a document to be circulated, as circulation destinations. For example, assuming that an access right is set in a document A as shown in FIG. 6, when a user is to circulate the document A, it has been conventionally necessary for the user to designate circulation destinations. In this embodiment, when the user designates circulation of the document A, the system inquires of the user whether or not the access right list is used as circulation destinations. If the user consents to use the access right list, the users and group in the access right list are added to the circulation destinations (FIG. 7).

In a case where plural types of access right exist, users of a designated access right may be added as circulation destinations. In this example, when users having "write" access right for the document A are designated as circulation destinations, a user A and a group A are added as circulation destinations but a user B is not added.

Further, it may be arranged such that some roles among such access rights are not reutilized as circulation destinations. For example, in a document management system where a system administrator has a "read/write" access right for all the documents, the administrator may be automatically omitted from circulation destinations.

Further, an access right list set in another document may be reutilized as circulation destinations of the document A.

In this example, the access right list is reutilized for setting of circulation, however, it may be reutilized for e-mail notification.

In this example, e-mail notification destinations set in a document are reutilized as circulation destinations.

Figure 8:
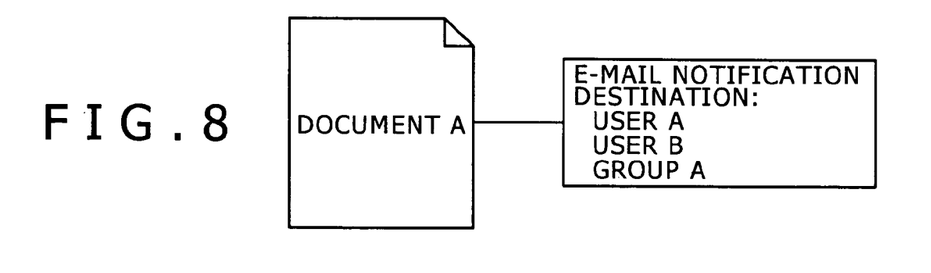
FIG. 8 is an explanatory diagram showing an operation for setting a circulation object utilizing an e-mail notification destination list.

FIG. 8 shows that the user A, the user B and the group A are set as e-mail notification destinations in the document A. When the document A has been updated, an e-mail notifying of the update of the document A is transmitted from the system to e-mail notification destinations.

When the user is to circulate the document A, the system examines whether or not e-mail notification destinations are set in the document. If e-mail notification destinations are set, the system inquires of the user whether or not the destinations are to be reutilized as circulation destinations. If the user consents to reutilize the destinations as circulation destinations, the system adds the e-mail notification destinations as circulation destinations of the document.

Figure 9:
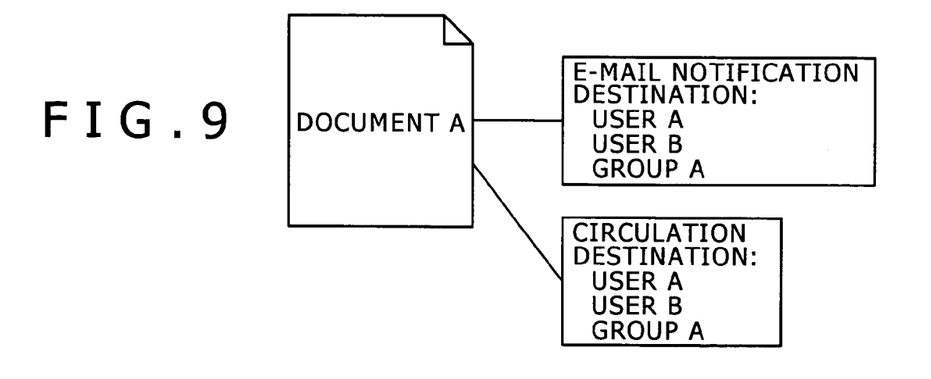
FIG. 9 is an explanatory diagram showing an operation for setting a circulation object utilizing an e-mail notification destination list.

FIG. 9 shows that the e-mail notification destinations are added as circulation destinations of the document A.

In a case where e-mail notifications of different events are set in the document, it may be arranged such that the system inquires of the user what event e-mail notification destinations are reutilized as circulation destinations.

Further, e-mail notification destinations of another document may be reutilized as circulation destinations of the document A.

It may be arranged such that an access right is set by utilizing setting of e-mail notification destinations. For example, users as e-mail notification destinations may be provided with all the rights.

In this example, an access history of a document is reutilized for designation of circulation destinations of the document.

Figure 10:
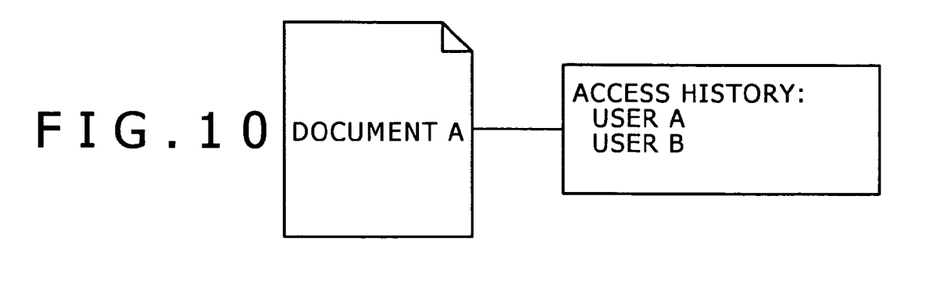
FIG. 10 is an explanatory diagram showing an operation for setting a circulation object utilizing an access history.

FIG. 10 is a conceptual diagram of a system which manages an access history of the document A. It is understood from the figure that the user A and the user B have accessed the document A.

When the user is to circulate the document A, the system examines the access history of the document A. If the document has been accessed, the system inquires of the user whether or not the access history is reutilized for designation of circulation destinations. If the user consents to reutilize the access history, the system adds the access history as circulation destinations of the document A.

Figure 11:
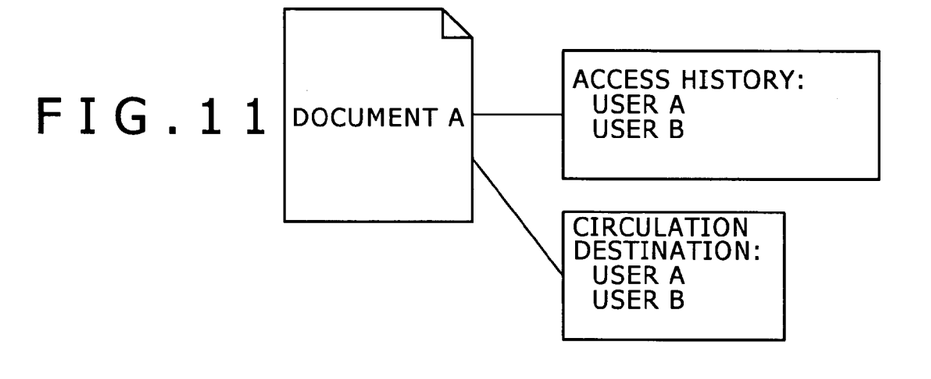
FIG. 11 is an explanatory diagram showing an operation for setting a circulation object utilizing an access history.

FIG. 11 shows that the access history of the document A is added as circulation destinations.

It may be arranged such that the user stores access time in the access history and when the access history is reutilized for designation of circulation destinations, the access history before/after time designated by the user is reutilized as circulation destinations. Further, the access history included between two time points designated by the user may be reutilized as circulation destinations, and a list designates users who have accessed a document between the two points.

Further, the access history of another document may be reutilized as circulation destinations of the document A.

Figure 12:
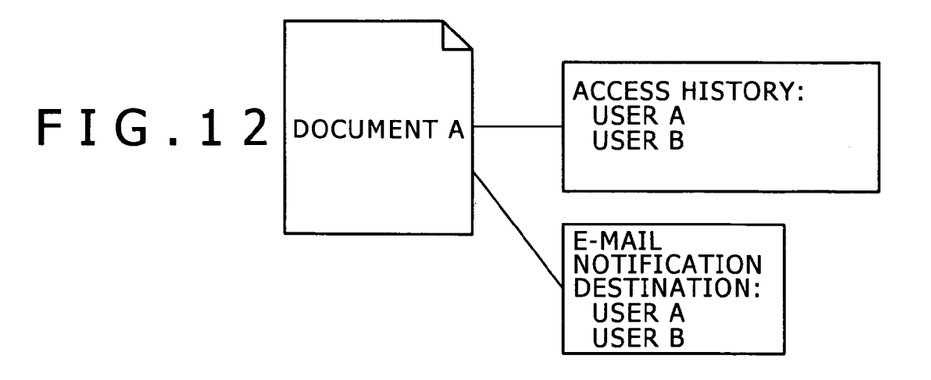
FIG. 12 is an explanatory diagram showing an operation for setting an e-mail notification object utilizing an access history.

In this example, the access history is reutilized for setting of circulation, however, it may be reutilized as e-mail notification destinations as shown in FIG. 12.

As described above, some embodiments of the invention are outlined below.

According to the embodiments of the invention, a document management apparatus for managing an object performs a setting of the operation related to the object by utilizing a content of past setting of an operation related to another object of the same or a different type.

In the embodiment of this invention, users or a group described in an access right list held in the document to be circulated can be reutilized as circulation destinations. Further, the access right list of another document can be attached as circulation destinations of the document.

In the embodiment of this invention, in a case where e-mail notification is set in the document to be circulated, destinations of e-mail notification can be reutilized as circulation destinations of the document. Further, destinations of e-mail notification of another document can be attached as circulation destinations of the document. E-mail notification means a function of notifying of particular operation of a document to designated users by e-mail.

In the embodiment of this invention, in a case where the document to be circulated was accessed in the past, the user who accessed the document can be attached as a circulation destination of the document.

In the embodiment of this invention, new setting can be easily made by utilizing past setting of an operation related to an object of the same or a different type. The past setting may be utilized without any change, otherwise, the past setting may be changed.

Other objects than a document are a folder, a document version, a document file format, a bulletin board, an article, a calendar, a schedule, a URL, document circulation, e-mail notification, a search folder, a user, and a group. However, the objects are not limited to them. The object is defined with data and method.

In the embodiment of this invention, the above operation may be managed as an object.

In the embodiment of this invention, although not limited to this example, past setting of an operation for document circulation is utilized for setting of operation for e-mail notification upon a document update. Further, the past setting of the operation for document circulation is utilized for setting of a document access right.

In the embodiment of this invention, past setting of a document access right is utilized for setting of an operation for document circulation. Further, the past setting of a document access right is utilized for setting of an operation for e-mail notification upon a document update.

In the embodiment of this invention, past setting of an operation for e-mail notification upon a document update is utilized for setting of an operation for document circulation. Further, the past setting of the operation for e-mail notification upon a document update is utilized for setting of a document access right.

Note that the present invention can be implemented as a method as well as an apparatus or system. Further, a part of the invention can be realized as software. Further, a software product used for execution of such software by a computer is included in the technical score of the invention.

According to an embodiment of the present invention, setting of an operation related to an object can be easily performed by utilizing past setting.

Note that the present invention is not limited to the above-described embodiments but various changes can be made without departing from its subject matter. For example, the present invention may be applied to e-mail notification of an added access right, article, or added related article in use of bulletin board or article object.

The entire disclosure of Japanese Patent Application No. 2004-202624 filed on Jul. 9, 2004 including specification, claims, drawings and abstract is incorporated herein by reference in its entirety.

What is claimed is:

1. A document management apparatus for managing a document, the document management apparatus containing a storage medium readable by a computer, the storage medium storing a program of instructions executable by the computer, the program comprising:

an input unit that inputs lists of users associated with documents;

an execution unit that executes predetermined operations relating to the documents using the lists;

a setting selection unit that selects a first list of users associated in memory with a first document, the execution unit having executed a first predetermined operation on the first document using the first list; and an object selection unit that designates a second document, wherein the document management apparatus uses the first list to execute a second predetermined operation, for each user in the first list, on the second document, the first and second predetermined operations are of different types, the first list is a circulation destination e-mail account list and the second predetermined operation is an e-mail notification triggered by a document update, and the apparatus issues an inquiry to a user and determines to use the circulation destination e-mail account list to execute the e-mail notification triggered by the document update based on a user reply input.

2. The document management apparatus according to claim 1, wherein the first and second predetermined operations are also managed as respective objects.

3. The document management apparatus according to claim 1, wherein the first document is managed as an object, and at least one of a folder, a document version, a document file format, a bulletin board, an article, a calendar, a schedule, a URL, document circulation, e-mail notification, a search folder, a user, and a group, is also managed as an object.

4. A document management apparatus for managing a document, the document management apparatus containing a storage medium readable by a computer, the storage medium storing a program of instructions executable by the computer, the program comprising:

an input unit that inputs lists of users associated with documents;

an execution unit that executes predetermined operations relating to the documents using the lists;

a setting selection unit that selects a first list of users associated in memory with a first document, the execution unit having executed a first predetermined operation on the first document using the first list; and an object selection unit that designates a second document, wherein the document management apparatus uses the first list to execute a second predetermined operation, for each user in the first list, on the second document, the first and second predetermined operations are of different types, the first list is a list of users with document access rights to the first document and the second predetermined operation is an e-mail notification triggered by a document update, and the apparatus issues an inquiry to a user and determines to use the list of users with document access rights to execute the e-mail notification triggered by the document update based on a user reply input.

5. The document management apparatus according to claim 4, wherein the first and second predetermined operations are also managed as respective objects.

6. The document management apparatus according to claim 4, wherein the first document is managed as an object, and at least one of a folder, a document version, a document file format, a bulletin board, an article, a calendar, a schedule, a URL, document circulation, e-mail notification, a search folder, a user, and a group, is also managed as an object.

7. A document management method for managing a document, comprising:

inputting lists of users associated with documents;

executing predetermined operations relating to the documents using the lists;

selecting a first list of users associated in memory with a first document, after executing a first predetermined operation on the first document using the first list; and designating a second document, wherein the first list is used to execute a second predetermined operation, for each user in the first list, on the second document, the method is performed by a processor, the first and second predetermined operations are of different types, the first list is a circulation destination e-mail account list and the second predetermined operation is an e-mail notification triggered by a document update, and an inquiry is issued to a user and a determination is made to use the circulation destination e-mail account list to execute the e-mail notification triggered by the document update based on a user reply input.

8. The document management method according to claim 7, wherein the first and second predetermined operations are also managed as respective objects.

9. The document management method according to claim 7, wherein the first document is managed as an object, and at least one of a folder, a document version, a document file format, a bulletin board, an article, a calendar, a schedule, a URL, document circulation, e-mail notification, a search folder, a user, and a group, is also managed as an object.

10. A document management method for managing a document, comprising:

inputting lists of users associated with documents;

executing predetermined operations relating to the documents using the lists;

selecting a first list of users associated in memory with a first document, after executing a first predetermined operation on the first document using the first list;

designating a second document, wherein the first list is used to execute a second predetermined operation, for each user in the first list, on the second document, the method is performed by a processor, the first and second predetermined operations are of different types, the first list is a list of users with document access rights to the first document and the second predetermined operation is an e-mail notification triggered by a document update, and an inquiry is issued to a user and a determination is made to use the list of users with document access rights to execute the e-mail notification triggered by the document update based on a user reply input.

11. The document management method according to claim 10, wherein the first and second predetermined operations are also managed as respective objects.

12. The document management method according to claim 10, wherein the first document is managed as an object, and at least one of a folder, a document version, a document file format, a bulletin board, an article, a calendar, a schedule, a URL, document circulation, e-mail notification, a search folder, a user, and a group, is also managed as an object.

13. A storage medium readable by a computer, the storage medium storing a program of instructions executable by the computer to perform a function utilized for managing a document, the function comprising:

inputting lists of users associated with documents;

executing predetermined operations relating to the documents using the lists;

selecting a first list of users associated in memory with a first document, after executing a first predetermined operation on the first document using the first list; and designating a second document, wherein the first list is used to execute a second predetermined operation, for each user in the first list, on the second document, the first and second predetermined operations are of different types, the first list is a circulation destination e-mail account list and the second predetermined operation is an e-mail notification triggered by a document update, and an inquiry is issued to a user and a determination is made to use the circulation destination e-mail account list to execute the e-mail notification triggered by the document update based on a user reply input.

14. The storage medium readable by a computer according to claim 13, wherein the first and second predetermined operations are also managed as respective objects.

15. The storage medium readable by a computer according to claim 13, wherein the first document is managed as an object, and at least one of a folder, a document version, a document file format, a bulletin board, an article, a calendar, a schedule, a URL, document circulation, e-mail notification, a search folder, a user, and a group, is also managed as an object.

16. A storage medium readable by a computer, the storage medium storing a program of instructions executable by the computer to perform a function utilized for managing a document, the function comprising:

inputting lists of users associated with documents;

executing predetermined operations relating to the documents using the lists;

selecting a first list of users associated in memory with a first document, after executing a first predetermined operation on the first document using the first list; and designating a second document, wherein the first list is used to execute a second predetermined operation, for each user in the first list, on the second document, the first and second predetermined operations are of different types, the first list is a list of users with document access rights to the first document and the second predetermined operation is an e-mail notification triggered by a document update, and an inquiry is issued to a user and a determination is made to use the list of users with document access rights to execute the e-mail notification triggered by the document update based on a user reply input.

17. The storage medium readable by a computer according to claim 16, wherein the first and second predetermined operations are also managed as respective objects.

18. The storage medium readable by a computer according to claim 16, wherein the first document is managed as an object, and at least one of a folder, a document version, a document file format, a bulletin board, an article, a calendar, a schedule, a URL, document circulation, e-mail notification, a search folder, a user, and a group, is also managed as an object.

* * * * *